United States Patent
Fujiwara et al.

(10) Patent No.: US 9,674,708 B2
(45) Date of Patent: *Jun. 6, 2017

(54) MONITORING UNAUTHORIZED ACCESS POINT

(71) Applicant: International Business Machines Corporation, Armonk, NY (US)

(72) Inventors: Yayoi Fujiwara, Tokyo (JP); Shinkichi Hamada, Tokyo (JP); Yukihiro Murakami, Tokyo (JP); Yasutaka Nishimura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,715

(22) Filed: Jun. 20, 2016

(65) Prior Publication Data

US 2016/0302073 A1    Oct. 13, 2016

Related U.S. Application Data

(63) Continuation of application No. 14/348,594, filed as application No. PCT/JP2012/067300 on Jul. 6, 2012, now Pat. No. 9,374,711.

(30) Foreign Application Priority Data

Sep. 30, 2011   (JP) .................................. 2011-215996

(51) Int. Cl.
*G06F 7/04* (2006.01)
*H04W 12/08* (2009.01)
(Continued)

(52) U.S. Cl.
CPC ........... *H04W 12/08* (2013.01); *H04L 63/102* (2013.01); *H04W 12/12* (2013.01); *H04W 24/08* (2013.01); *H04W 88/08* (2013.01); *H04W 88/18* (2013.01)

(58) Field of Classification Search
CPC ..... H04W 12/08; H04W 24/08; H04W 12/12; H04W 88/18; H04W 88/08
See application file for complete search history.

(56) References Cited

U.S. PATENT DOCUMENTS 9,374,711 B2    6/2016 Fujiwara et al.
2003/0117985 A1    6/2003 Fujii et al.
(Continued)

FOREIGN PATENT DOCUMENTS

CN    102158869 A    8/2011
EP    1593284 B1    4/2012
(Continued)

OTHER PUBLICATIONS

Office Action, dated Nov. 2, 2015, regarding U.S. Appl. No. 14/348,594, 23 pages.
(Continued)

*Primary Examiner* — Mohammed Waliullah
(74) *Attorney, Agent, or Firm* — Yee & Associates, P.C.; Richard A. Wilhelm

(57) ABSTRACT

A monitoring system, monitoring server, method, and program that, when an unauthorized access point is installed, effectively block wireless communications performed by the unauthorized access point, a monitoring system including a monitoring server for monitoring an unauthorized access point and multiple terminals connected to the monitoring server via a network is provided. The terminals acquire radio wave information from radio waves transmitted by an access point, and transmit the radio wave information to the moni-
(Continued)

toring server. The monitoring server detects an unauthorized access point using terminal information including the radio wave information received from the terminals, designates a terminal as a pseudo-access point using intensity of radio waves transmitted by the unauthorized access point, and instructs the terminal to transmit radio waves. The terminal transmits radio waves in accordance with the instruction from the monitoring server.

14 Claims, 6 Drawing Sheets

(51) Int. Cl.
*H04W 12/12* (2009.01)
*H04W 24/08* (2009.01)
*H04L 29/06* (2006.01)
*H04W 88/08* (2009.01)
*H04W 88/18* (2009.01)

(56) References Cited

U.S. PATENT DOCUMENTS

| 2005/0128989 | A1 | 6/2005 | Bhagwat et al. |
| 2006/0200862 | A1 | 9/2006 | Olson et al. |
| 2008/0002651 | A1 | 1/2008 | Nakano |
| 2008/0066157 | A1* | 3/2008 | Stevens ............... H04L 63/1416 726/4 |
| 2010/0142709 | A1* | 6/2010 | Robert ................ H04L 63/1408 380/270 |
| 2010/0296457 | A1 | 11/2010 | Hosono |
| 2014/0304783 | A1 | 10/2014 | Fujiwara et al. |

FOREIGN PATENT DOCUMENTS

| JP | 2003198571 A | 7/2003 |
| JP | 2006517763 A | 7/2006 |
| JP | 2006279438 A | 10/2006 |
| JP | 2007089006 A | 4/2007 |
| JP | 2007174287 A | 7/2007 |
| JP | 2009022027 A | 1/2009 |
| JP | 2009022028 A | 1/2009 |
| JP | 4229148 B2 | 2/2009 |
| JP | 2010263310 A | 11/2010 |
| JP | 4639195 B2 | 2/2011 |
| JP | 2011097437 A | 5/2011 |
| JP | 4717898 B2 | 7/2011 |

OTHER PUBLICATIONS

Notice of Allowance, dated Mar. 11, 2016, regarding U.S. Appl. No. 14/348,594, 9 pages.

* cited by examiner

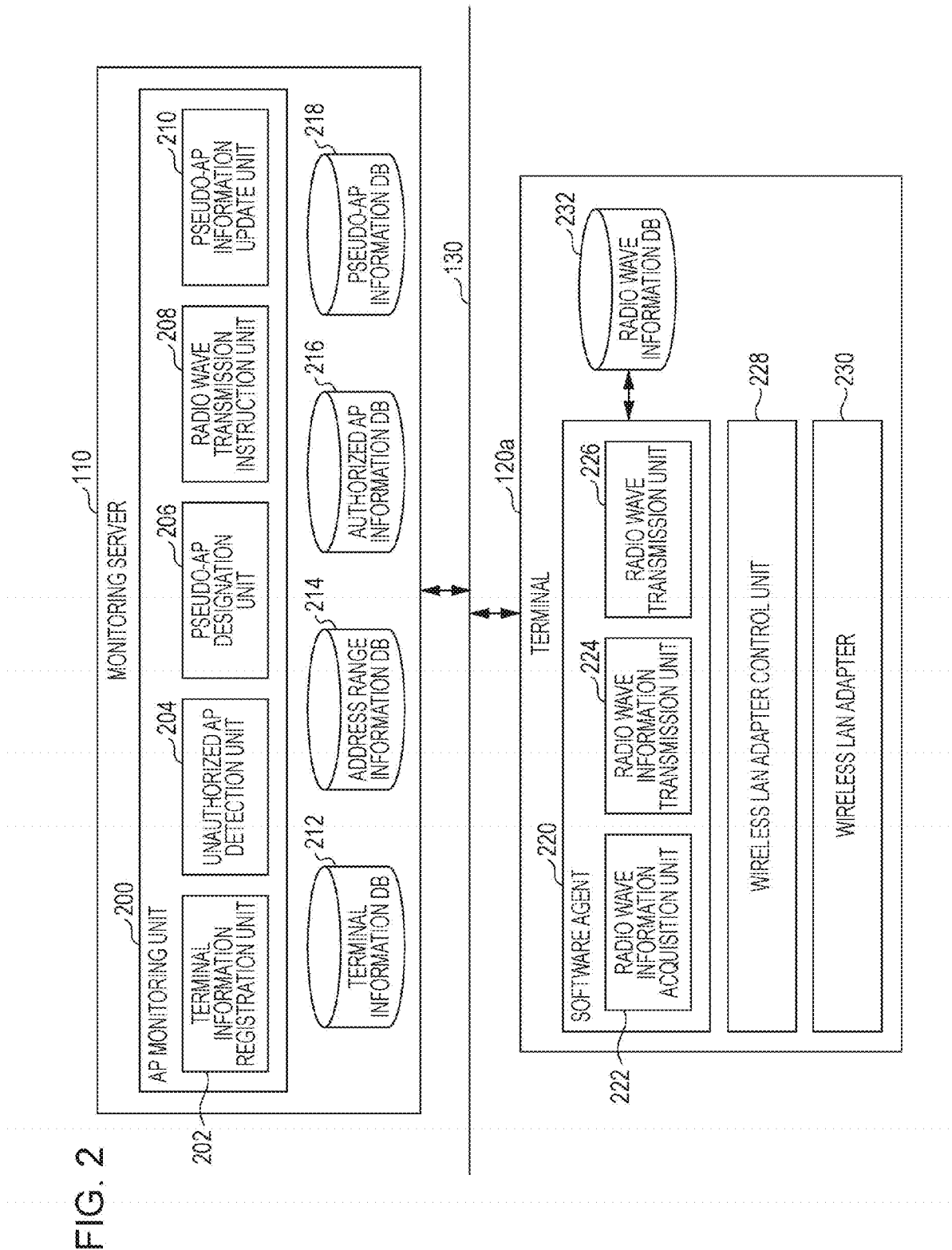

| IP ADDRESS RANGE | POSITION INFORMATION |
|---|---|
| 192.168.1.0/24 | TOKYO/BLDG.1/16F/EAST |
| 192.168.2.0/24 | TOKYO/BLDG.1/16F/WEST |
| ... | ... |

312 / 314

320

| TERMINAL NAME/TERMINAL IDENTIFICATION INFORMATION | QUASI-AP IDENTIFICATION INFORMATION |
|---|---|
| TERMINAL 1/00-1F-AA-11-11 | IBM1 |
| TERMINAL 2/00-1F-AA-11-22 | IBM2 |
| TERMINAL 3/00-2A-BB-22-11 | IBM3 |
| ... | ... |

322 / 324

330

| TERMINAL INFORMATION IDENTIFICATION INFORMATION | RADIO INTENSITY | PROTOCOL INFORMATION |
|---|---|---|
| 00-2A-BB-22-11 | 40% | SSID:IBM3,1ch(11g) |
| 00-23-45-67-89 | 90% | SSID:BAD,6ch(11g) |
| ... | ... | ... |

332 / 334 / 336

340

| TERMINAL NAME/TERMINAL IDENTIFICATION INFORMATION | POSITION INFORMATION | RADIO WAVE INFORMATION | RADIO WAVE MEASUREMENT TIME |
|---|---|---|---|
| TERMINAL 1/00-1F-AA-11-11 | TOKYO/BLDG.1/16F/EAST | 00-23-45-67-89,90%/SSID:BAD,6ch(11g) | 05/01/2011/11:36:45 |
| TERMINAL 2/00-1F-AA-11-22 | TOKYO/BLDG.1/16F/EAST | 00-2A-BB-22-11,40%/SSID:IBM3,1ch(11g)/00-2A-BB-22-11,80%/SSID:BAD,6ch(11g) | 05/01/2011/12:16:45 |
| ... | ... | ... | ... |

342 / 344 / 346 / 348

350

| TERMINAL NAME/TERMINAL IDENTIFICATION INFORMATION | POSITION INFORMATION |
|---|---|
| TERMINAL 1/00-1F-AA-11-11 | TOKYO/BLDG.1/16F/EAST |
| TERMINAL 2/00-1F-AA-11-22 | TOKYO/BLDG.1/16F/WEST |
| ... | ... |

352 / 354

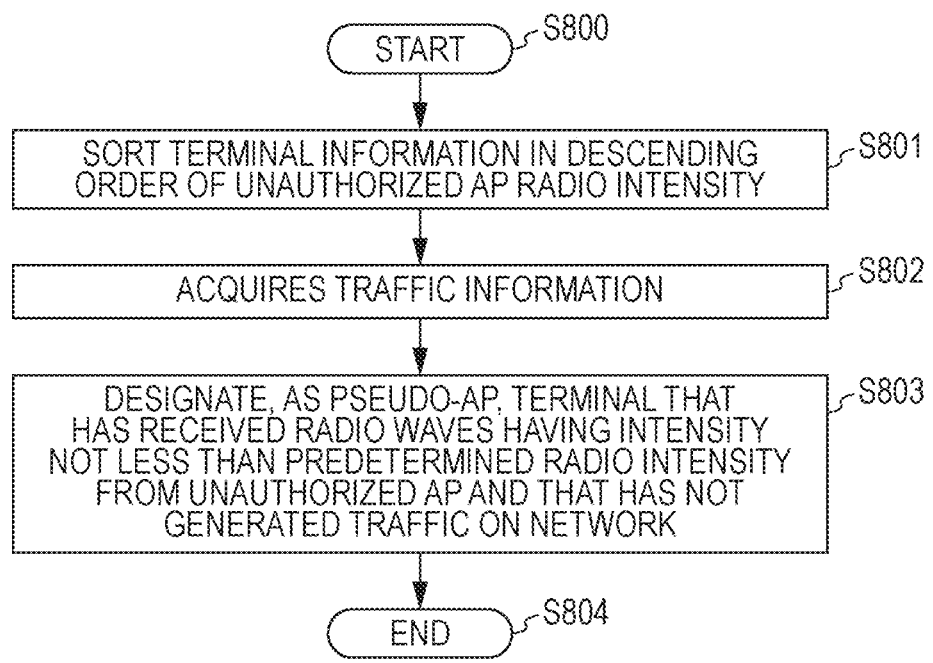

MONITORING UNAUTHORIZED ACCESS POINT

This Application is a continuation of and claims the benefit of priority to U.S. patent application Ser. No. 14/348,594, filed May 21, 2014, which is a continuation of and claims priority under 35 U.S.C. §371 to International Application No. PCT/JP2012/067300 filed on Jul. 6, 2012, which claims priority to Japanese Patent Application No. JP2011-215996 filed on Sep. 30, 2011. The contents of the aforementioned applications are incorporated herein by reference.

TECHNICAL FIELD

The present invention relates to a technology for monitoring an access point and in particular to a monitoring system, monitoring server, method, and program for monitoring an unauthorized access point and blocking wireless communications performed by the unauthorized access point.

BACKGROUND ART

Recently, tethering using a smart phone or use of a mobile router has allowed easy acquisition of an access point, which is means for installing a wireless base station in a corporate facility or the like. Unauthorized connection of such an access point to a corporate network or the like may cause serious problems such as leakage of confidential information such as personal information. For this reason, there have been proposed technologies for blocking wireless communications performed by an unauthorized access point.

Patent Literature 1 discloses a method for detecting an unauthorized access point apparatus which is not connected to a wired LAN and preventing the unauthorized access point apparatus from accessing a wireless LAN terminal. In this method, a physically fixed, existing access point apparatus detects an unauthorized access point, generates blocking data at the timing when the unauthorized access point apparatus transmits a beacon frame, and transmits the blocking data to radio space.

CITATION LIST

Patent Literature

Japanese Patent No. 4229148

SUMMARY OF INVENTION

Technical Problem

However, where multiple access point apparatuses are present on one network, these access point apparatuses are generally installed so as to be physically away from each other. The method disclosed in Patent Literature 1 allows only an existing access point apparatus that has detected an unauthorized access point to transmit data for blocking wireless communications performed by the unauthorized access point. This disadvantageously prevents effective blocking of wireless communications performed by the unauthorized access point.

The present invention has been made to solve the above-mentioned problem. Accordingly, it is an object of the present invention to provide a monitoring system, monitoring server, method, and program that, when an unauthorized access point is installed, effectively blocks wireless communications performed by the access point.

Solution to Problem

The present invention provides a monitoring system including a monitoring server for monitoring an unauthorized access point and multiple terminals connected to the monitoring server via a network. The terminals acquire radio wave information from radio waves transmitted by an access point and transmits the radio wave information to the monitoring server. The monitoring server detects an unauthorized access point using terminal information including the radio wave information received from the terminals, designates a terminal as a pseudo-access point using intensity of radio waves transmitted by the unauthorized access point, and instructs the terminal to transmit radio waves. The terminal transmits radio waves in accordance with the instruction from the monitoring server.

According to the present invention, a monitoring server, method, and program can be provided that detect an unauthorized access point using terminal information including radio wave information received from terminals connected to the monitoring server via a network, designates a terminal as a pseudo-access point using intensity of radio waves transmitted by the unauthorized access point, and instructs the terminal as a pseudo-access point to transmit radio waves.

Advantageous Effects of Invention

Since the present invention employs the above-mentioned configuration, a terminal adjacent to an access point installed in an unauthorized manner is designated as a pseudo-access point. As a result, wireless communications performed by the unauthorized access point can be blocked effectively.

BRIEF DESCRIPTION OF DRAWINGS

FIG. 2 is a diagram showing respective functional configurations of a monitoring server and a terminal included in the monitoring system shown in FIG. 1.

FIG. 3 is a diagram showing an example of the data tables of databases held by the monitoring server and the terminals shown in FIG. 1.

FIG. 8 is a flowchart showing yet another example of the process of step S503 shown in FIG. 5.

DESCRIPTION OF EMBODIMENT

Figure 1:
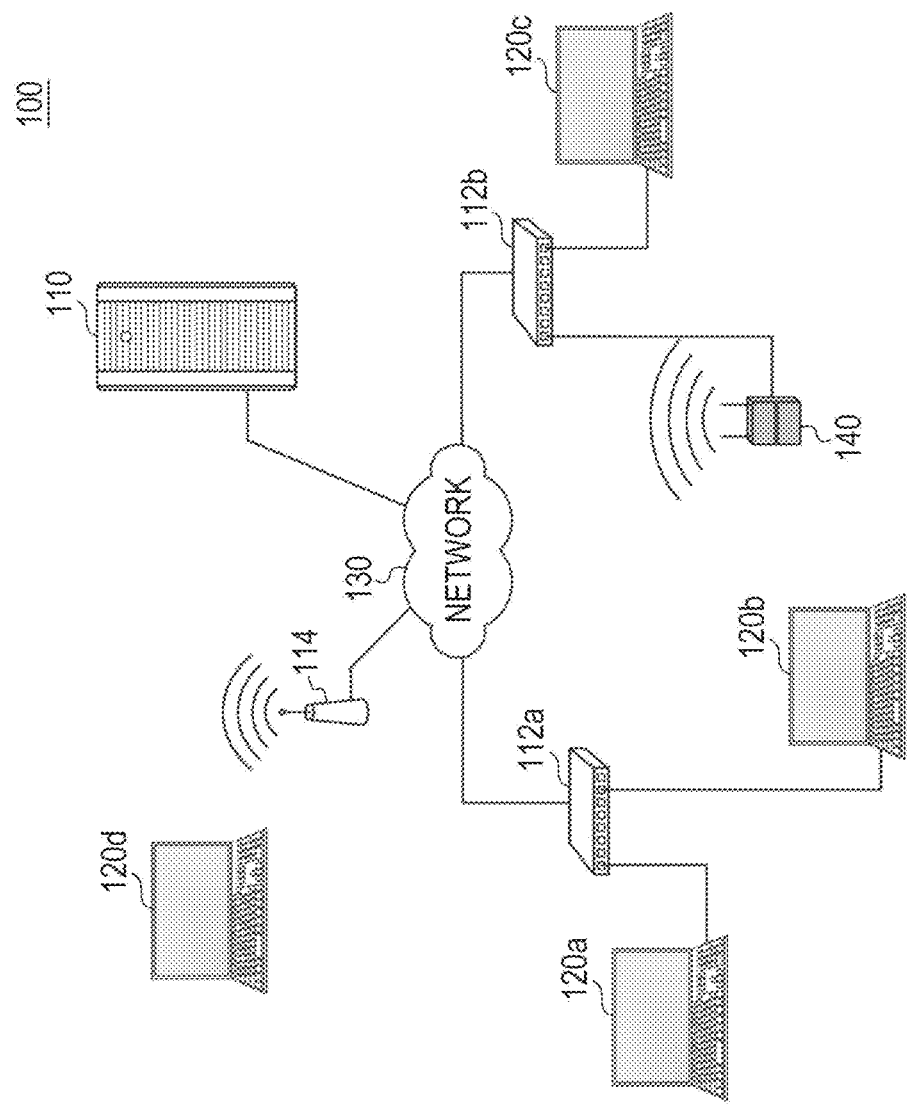
FIG. 1 is a drawing showing a monitoring system for monitoring an unauthorized wireless LAN access point according to an embodiment of the present invention.

The present invention will be described using an embodiment but not limited thereto. FIG. 1 is a drawing showing a monitoring system for monitoring an unauthorized wireless LAN (local area network) access point according to an embodiment of the present invention. Referring now to FIG. 1, a monitoring system 100 will be described.

The monitoring system 100 includes a monitoring server 110, hubs 112a and 112b, an access point 114, and terminals 120a, 120b, 120c, and 120d. These apparatuses are connected to a network 130 constructed by a LAN.

The monitoring server 110 is a server apparatus for monitoring an unauthorized wireless LAN access point. The monitoring server 110 gathers radio wave information from the terminals 120a to 120d via the network 130 and monitors whether an unauthorized wireless LAN access point is installed.

The monitoring server 110 executes a program according to the present invention written in a programming language such as assembler, C, C++, Java®, JavaScript®, PERL, PHP, RUBY, and PYTHON under the control of an operating system (OS) such as Windows® series, including Windows® 7, Windows Vista®, Windows XP®, and Windows200X Server®, Mac OS®, UNIX®, and LINUX®.

The monitoring server 110 includes a RAM for providing execution space for executing the program according to the present invention, a hard disk drive (HDD) for continuously holding programs, data, and like, and storage devices such as flash memory. It implements functional units according to the present invention (to be discussed later) on itself by executing the program according to the present invention. The functional units according to the present invention can be implemented by the above-mentioned apparatus-executable program written in a programming language or the like. The program according to the present invention can be transmitted in a format readable by different information processing apparatuses via a network.

The terminals 120a, 120b, 120c, and 120d are information processing apparatuses having a wireless communications function. The terminals 120a, 120b, 120c, and 120d provide radio wave information to the monitoring server 110 via the network 130, as well as transmit various types of radio wave in accordance with an instruction from the monitoring server 110. In the example shown in FIG. 1, the terminals 120a, 120b, and 120c are connected to the network 130 via the hubs 112a and 112b and communicate with the monitoring server 110 by wire. While the terminals 120a, 120b, 120c, and 120d shown in FIG. 1 are notebook PCs, they may be information processing apparatuses, such as various types of computers, including desk-top PCs and tablet PCs, and mobile information terminals, including smart phones, cellular phones, and PDFs, in other embodiments.

The terminals 120a, 120b, 120c, and 120d execute a program according to the present invention written in a programming language such as assembler, C, C++, Java®, JavaScript®, PERL, PHP, RUBY, and PYTHON under the control of an OS, such as Windows® series, including Windows® 7, Windows Vista®, Windows XP®, Windows200X Server®, and Windows Mobile®, Mac OS®, UNIX®, LINUX®, Android®, Google Chrome Os, TRON, and ITRON.

The terminals 120a, 120b, 120c, and 120d each include a RAM for providing execution space for executing the program according to the present invention, a hard disk drive (HDD) for continuously holding programs, data, and like, and storage devices such flash memory. They implement functional units according to the present invention (to be discussed later) on themselves by executing the program according to the present invention. The functions according to the present invention can be performed by the above-mentioned apparatus-executable program written in a programming language or the like. The program according to the present invention can be transmitted in a format readable by other information processing apparatuses via the network.

The access point 114 is a router apparatus having a wireless communications function, such as a mobile router, and is connected to the network 130. In this embodiment, the access point 114 is an authorized access point, which is authorized to access the monitoring system 100. The terminals 120a, 120b, 120c, and 120d communicate with each other wirelessly via the access point 114.

The monitoring system 100 shown in FIG. 1 also includes an access point 140. The access point 140 is an unauthorized access point, which is not authorized to access the monitoring system 100, but is connected to the network 130 via the hub 112b.

FIG. 2 is a diagram showing the respective function configurations of the monitoring server 110 and the terminal 120a included in the monitoring system 100 shown in FIG. 1. Referring now to FIG. 2, the function configurations of the monitoring server 110 and the terminal 120a will be described. Note that the function configurations of the terminals 120b, 120c, and 120d are the same as that of the terminal 120a and therefore will not be described.

The monitoring server 110 includes an access point monitoring unit 200, a terminal information database 212, an address range information database 214, an authorized access point information database 216, and a pseudo-access point information database 218.

The access point monitoring unit 200 is function means for monitoring an unauthorized access point. It includes a terminal information registration unit 202, an unauthorized access point detection unit 204, a pseudo-access point designation unit 206, a radio wave transmission instruction unit 208, and a pseudo-access point information update unit 210.

The terminal information registration unit 202 is function means for registering terminal information, including radio wave information received from the terminals 120a, 120b, 120c, and 120d in the terminal information database 212. Upon receipt of radio wave information from these terminals via the network 130, the terminal information registration unit 202 derives terminal information including the radio wave information and registers the terminal information in the terminal information database 212. The terminal information database 212 will be described in detail with reference to FIG. 3 later.

The unauthorized access point detection unit 204 is function means for detecting an unauthorized access point. The unauthorized access point detection unit 204 uses authorized access point information registered in the authorized access point information database 216 and terminal information registered in the terminal information database 212 to detect whether there is an unauthorized access point. The authorized access point information database 216 will be described in detail with reference to FIG. 3 later.

The pseudo-access point designation unit 206 is function means for designating a terminal as a pseudo-access point for blocking wireless communications performed by an unauthorized access point (hereafter referred to as "pseudo-access point"). The pseudo-access point designation unit 206 refers to the terminal information database 212 to determine a terminal which is suitable for blocking wireless communications performed by an unauthorized access point and which is adjacent to the unauthorized access point, and designates the terminal as a pseudo-access point.

The pseudo-access point designation unit 206 refers to the terminal information database 212 and notifies the administrator of the monitoring system 100 of information (terminal name, MAC address, position information, etc.) for identifying the terminal designated as a pseudo-access point, for example, by displaying the information on the display apparatus of the monitoring server 110. Alternatively, the pseudo-access point designation unit 206 may notify the administrator by transmitting the information to a previously specified email address.

The radio wave transmission instruction unit 208 is function means for transmitting a radio wave transmission instruction to the terminal designated by the pseudo-access point designation unit 206. The radio wave transmission instruction unit 208 transmits the radio wave transmission instruction to the terminal designated as a pseudo-access point in order to cause the terminal to transmit radio waves.

The pseudo-access point information update unit 210 is function means for registering, in the pseudo-access point information database 218, information for identifying the terminal which is designated as a pseudo-access point and to which the radio wave transmission instruction unit 208 has transmitted the radio wave transmission instruction as well as pseudo-access point information including information on the position of the terminal. The pseudo-access point information database 218 will be described in detail with reference to FIG. 3 later.

The terminal 120a includes a software agent 220, a wireless LAN adapter control unit 228, a wireless LAN adapter 230, and a radio wave information database 232.

The software agent 220 is a program that is installable to the terminal 120a, and includes a radio wave information acquisition unit 222, a radio wave information transmission unit 224, and a radio wave transmission unit 226. The software agent 220 may be implemented as a program that always starts up when the terminal 120a starts up, or may be implemented as a program that starts up in accordance with a startup instruction from the user.

The radio wave information acquisition unit 222 is function means for acquiring radio wave information detected by the wireless LAN adapter control unit 228. The radio wave information acquisition unit 222 periodically acquires radio wave information from the wireless LAN adapter 230 via the wireless LAN adapter control unit 228 and registers the radio wave information in the radio wave information database 232. The radio wave information database 232 will be described in detail with reference to FIG. 3 later.

The radio wave information transmission unit 224 is function means for transmitting radio wave information to the monitoring server 110. The radio wave information transmission unit 224 periodically acquires radio wave information from the radio wave information database 232 and transmits the radio wave information to the monitoring server 110.

The radio wave transmission unit 226 is function means for causing the wireless LAN adapter 230 to transmit radio waves for blocking wireless communications performed by an unauthorized access point. Upon receipt of a radio wave transmission instruction from the monitoring server 110, the radio wave transmission unit 226 refers to radio wave information registered in the radio wave information database 232, determines radio waves suitable for blocking wireless communications performed by an unauthorized access point, and causes the wireless LAN adapter 230 to transmit the radio waves via the wireless LAN adapter control unit 228. The radio wave transmission unit 226 also transmits radio waves including information for identifying the terminals 120a, 120b, 120c, and 120d and protocol information. The radio wave transmission unit 226 periodically refers to the radio wave information database 232 and causes the wireless LAN adapter 230 to transmit radio waves until radio wave information from the unauthorized access point disappears.

For example, when an unauthorized access point is using IEEE802.11b/g as a wireless LAN communication protocol, the radio wave transmission unit 226 can refer to radio wave information registered in the radio wave information database 232, identify a channel being used by the access point, and cause the wireless LAN adapter 230 to transmit radio waves in the same frequency band as that allocated to the channel.

When a channel being used by an unauthorized access point changes with time, the radio wave transmission unit 226 can refer to radio wave information registered in the radio wave information database 232, identify the changed channel being used by the unauthorized access point, and cause the wireless LAN adapter 230 to transmit radio waves at the same frequency band as that allocated to the changed channel.

Further, the radio wave transmission unit 226 can refer to radio wave information registered in the radio wave information database 232, identify a channel being used by an unauthorized access point, and cause the wireless LAN adapter 230 to transmit radio waves in the same frequency band as that allocated to all channels of IEEE802.11b/g, including the channel.

In another embodiment, the radio wave transmission unit 226 may block wireless communications performed by an unauthorized access point, by making DoS (denial of service) attacks against the unauthorized access point, for example, by continuously transmitting access requests to the unauthorized access point.

Where a packet transmitted by an unauthorized access point is encrypted, the radio wave transmission unit 226 may block wireless communications performed by the access point, by decrypting the packet and transmitting a pseudo-packet to the unauthorized access point. In this case, the radio wave transmission unit 226 may store information on the decrypted packet in the form of a log, journal, or the like.

The wireless LAN adapter control unit 228 is function means for controlling the wireless LAN adapter 230. The wireless LAN adapter control unit 228 controls the wireless LAN adapter 230 in accordance with an instruction from the higher-order program, the software agent 220. The wireless LAN adapter control unit 228 also provides information on radio waves detected by the wireless LAN adapter 230 in accordance with an instruction from the software agent 220.

The wireless LAN adapter 230 is an apparatus that includes an antenna capable of transmitting and receiving radio waves and that performs wireless LAN communications. The wireless LAN adapter 230 detects radio waves transmitted by a surrounding access point, A/D converts the radio waves, and transmits the resulting radio waves to the wireless LAN adapter control unit 228. The wireless LAN adapter 230 also transmits radio waves in a specified frequency band or transmits a specific packet under the control of the wireless LAN adapter control unit 228.

FIG. 3 is a diagram showing an example of the data tables of databases held by the monitoring server 110 and the terminals 120a, 120b, 120c, and 120d. Referring now to FIG. 3, these data tables will be described.

An IP address range information table 310 is the data table of the address range information database 214 held by the monitoring server 110. An IP address range 312 and position information 314 are registered in the IP address range information table 310 in an associated manner. These pieces of information are previously set by the administrator of the monitoring system 100.

The IP address range 312 is the range of IP addresses allocated to the terminals 120a, 120b, 120c, and 120d. In this embodiment, when the user connects the terminals 120a, 120b, 120c, and 120d to the network 130, a DHCP (dynamic host configuration protocol) server included in the monitoring system 100 automatically allocates IP addresses in the IP address range 312 to these terminals.

In another embodiment, when the user connects the terminals 120a, 120b, 120c, and 120d to the network 130, the user may manually specify IP addresses in the IP address range 312.

The position information 314 is information indicating the positions where the terminals 120a, 120b, 120c, and 120d having the allocated IP addresses are connected to the network 130. The position information 314 can be set to each of IP address ranges shown by the IP address range 312.

In an example shown in FIG. 3, "192.168.1.0/24" and "192.168.2.0/24" are registered as examples of the IP address range, and "Tokyo/bldg.1/16F/east" and "Tokyo/bldg.1/16F/west" are registered with respect to these IP address ranges in an associated manner. That is, the IP address range information table 310 shows that a terminal to which an IP address in the IP address range "192.168.1.0/24" is allocated is present in "Tokyo/bldg.1/16F/east" and that a terminal to which an IP address in the IP address range "192.168.2.0/24" is allocated is present in "Tokyo/bldg.1/16F/west".

The authorized access point information table 320 is the data table of the authorized access point information database 216 held by the monitoring server 110. Terminal name and terminal identification information 322 and pseudo-access point identification information 324 are registered in the authorized access point information table 320 in an associated manner. These pieces of information are previously set by the administrator of the monitoring system 100.

The terminal name and terminal identification information 322 are the name of a terminal that can be designated as a pseudo-access point and information for identifying the terminal. A terminal name is any name that can be set by the administrator. Terminal identification information is information by which a terminal can be uniquely identified. In this embodiment, an ID number unique to an Ethernet® card used by a terminal, and a MAC (media access control) address, is used as terminal identification information.

The pseudo-access point identification information 324 is information for identifying a pseudo-access point in the monitoring system 100. Where the terminals 120a, 120b, 120c, and 120d are designated as pseudo-access points, the pseudo-access point identification information 324 is information for identifying the terminals 120a, 120b, 120c, and 120d serving as pseudo-access points. In this embodiment, an SSID (service set identifier), for which any alphanumeric characters can be set, are used as information for identifying a pseudo-access point.

A radio wave information table 330 is the data table of the radio wave information database 232 held by the terminals 120a, 120b, 120c, and 120d. Terminal identification information 332, radio intensity 334 derived from radio waves detected by the terminals 120a, 120b, 120c, and 120d, and protocol information 336 are registered in the radio wave information table 330 in an associated manner.

The terminal identification information 332 is terminal identification information derived from radio waves transmitted by the authorized access point 114 such as a router apparatus having a wireless communications function, the terminals 120a, 120b, 120c, and 120d, and the unauthorized access point 140. In this embodiment, the MAC addresses of these access points are used as terminal identification information 332.

The radio intensity 334 is the intensity of radio waves transmitted by an access point and represents the degree of actual radio intensity relative to the maximum radio intensity that the terminals 120a, 120b, 120c, and 120d can detect. While radio intensity is represented by a percentage in this embodiment, it may be represented by other numeric values (e.g., 0≤radio intensity≤1, etc.) in other embodiments.

The protocol information 336 is information on a communication protocol used by an access point. The protocol information 336 includes information for identifying an access point and information indicating the type of a communication protocol used by the access point. An example shown in FIG. 3 shows that an SSID is used as information for identifying an access point and that an access point to which "IBM3" is set as an SSID is using a channel "1" of the communication protocol "IEEE802.11g." This example also shows that an access point to which "BAD" is set as an SSID is using the channel "6" of the communication protocol "IEEE802.11g."

A terminal information table 340 is the data table of the terminal information database 212 held by the monitoring server 110. The monitoring server 110 derives terminal information by referring to the address range information database 214 and the authorized access point information database 216 and using radio wave information received from the terminals 120a, 120b, 120c, and 120d. Such terminal information is registered in the terminal information table 340. Terminal name and the terminal identification information 342, position information 344, radio wave information 346, and radio wave information measurement time 348 are registered in the terminal information table 340 in an associated manner.

The terminal name and terminal identification information 342 are the name of a terminal that has transmitted radio wave information, and information for identifying the terminal. The information for identifying the terminal is added to the radio wave information as metadata. The terminal name is a terminal name corresponding to the information for identifying the terminal, and the monitoring server 110 determines it by referring to the authorized access point information database 216.

The position information 344 is information indicating the position where the terminal indicated by the terminal name and the terminal identification information 342 is connected to the network 130. The monitoring server 110 determines the position information 344 by referring to the address range information database 214 and using the IP address of the terminal, which the metadata of the radio wave information.

The radio wave information 346 is radio wave information transmitted by a terminal indicated by the terminal name and terminal identification information 342. Terminal identification information of an access point which has transmitted radio waves detected by the terminal that has transmitted the radio wave information, radio intensity, and protocol information are registered in the radio wave information 346. The radio wave information measurement time 348 is the time when the monitoring server 110 receives the radio wave information.

The pseudo-access point information table 350 is the data table of the pseudo-access point information database 218 held by the monitoring server 110. Terminal name and terminal identification information 352 of a terminal designated as a pseudo-access point, and position information 354 of the terminal are registered in the pseudo-access point information table 350 in an associated manner.

Figure 4:
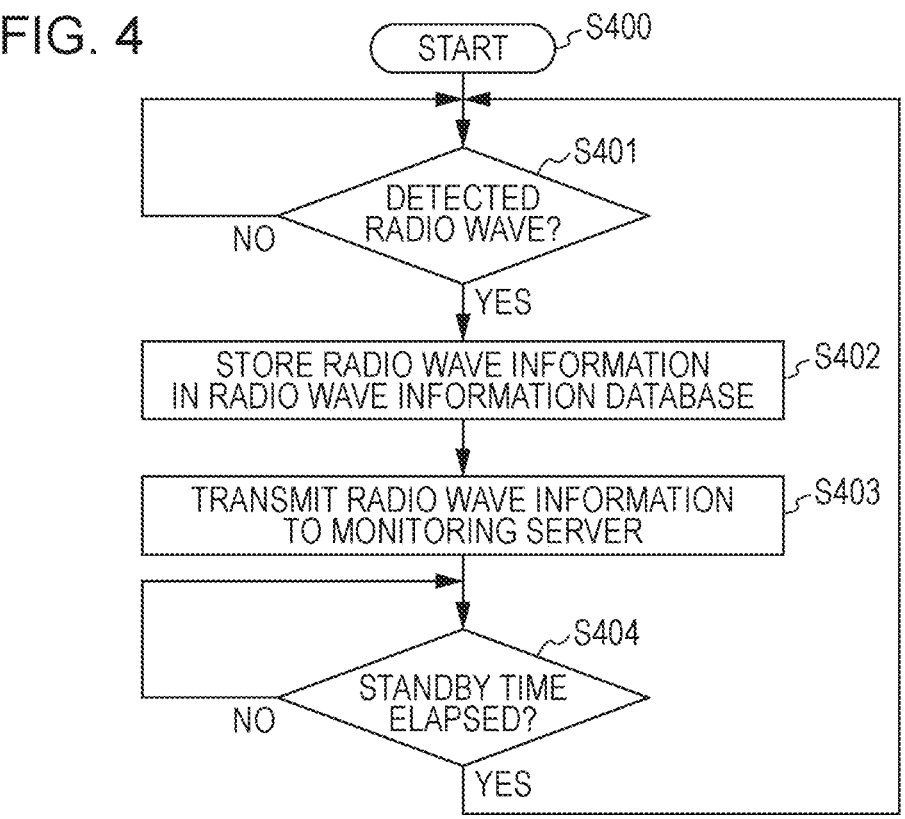
FIG. 4 is a flowchart showing an example of a process performed by the terminals according to the embodiment shown in FIG. 1.

FIG. 4 is a flowchart showing an example of a process performed by the terminal according to the embodiment shown in FIG. 1. Referring now to FIG. 4, a process performed by the terminal 120a will be described.

The process of FIG. 4 starts from step S400. In step S401, the radio wave information acquisition unit 222 of the software agent 220 of the terminal 120a determines whether it has detected radio waves from an adjacent access point. If it has not detected radio waves (NO), it repeats the process of step S401. In contrast, if it has determined radio waves (YES), it proceeds to step S402.

In step S402, the radio wave information acquisition unit 222 stores radio wave information included in the detected radio waves in the radio wave information database 232. In step S403, the radio wave information transmission unit 224 transmits the radio wave information stored in the radio wave information database 232 to the monitoring server 110.

In step S404, the software agent 220 determines whether standby time has elapsed. If the standby time has not elapsed (NO), it repeats the process of step S404. In contrast, if the standby time has elapsed (YES), it returns to step S401 and performs the above-mentioned process again. In this embodiment, any time can be set as the standby time.

Figure 5:
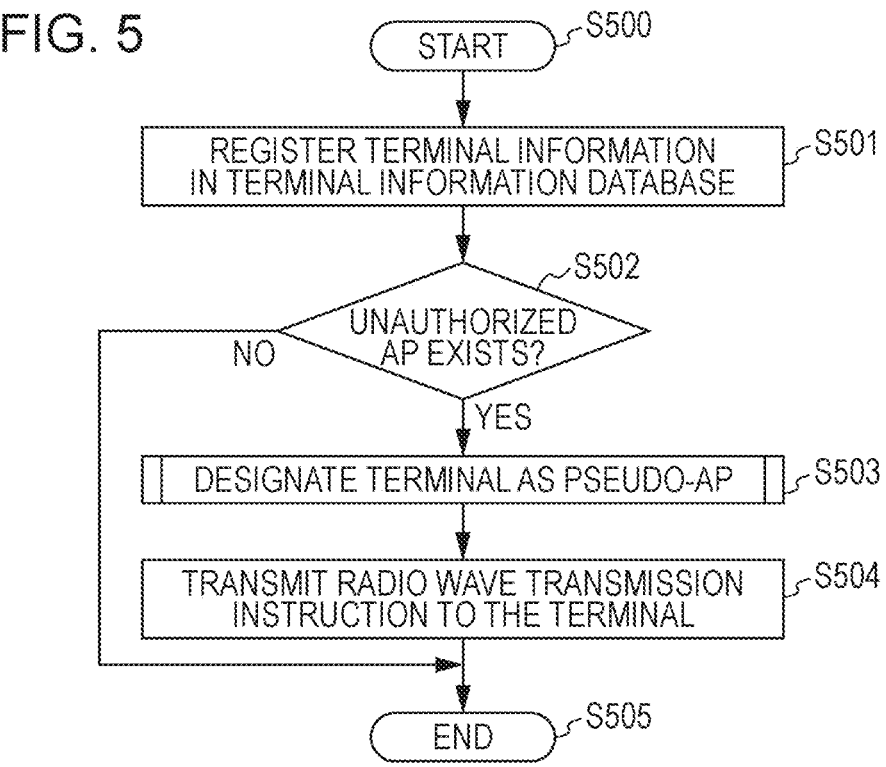
FIG. 5 is a flowchart showing an example of a process performed by the monitoring server according to the embodiment shown in FIG. 1.

FIG. 5 is a flowchart showing an example of a process performed by the monitoring server according to the embodiment shown in FIG. 1. Referring now to FIG. 5, the process performed by the monitoring server 110 will be described.

The process of FIG. 5 starts from step S500 where the monitoring server 110 receives radio wave information from the terminals 120a, 120b, 120c, and 120d. In step S501, the terminal information registration unit 202 of the access point monitoring unit 200 refers to the address range information database 214 and the authorized access point information database 216, derives terminal information using the received radio wave information and metadata thereof, and registers the terminal information in the terminal information database 212.

In step S502, the unauthorized access point detection unit 204 refers to the terminal information database 212 and the authorized access point information database 216 and determines whether radio wave information registered in the terminal information database 212 includes information for identifying an unauthorized access point. Thus, it determines whether there is an unauthorized access point. If there is no unauthorized access point (NO), the process proceeds to step S505 and ends. In contrast, if there is an unauthorized access point (YES), the process proceeds to step S503.

In step S503, the pseudo-access point designation unit 206 designates a terminal as a pseudo-access point. In step S504, the radio wave transmission instruction unit 208 transmits a radio wave transmission instruction to the terminal designated as a pseudo-access point in step S503. The process ends in step S505.

Figure 6:
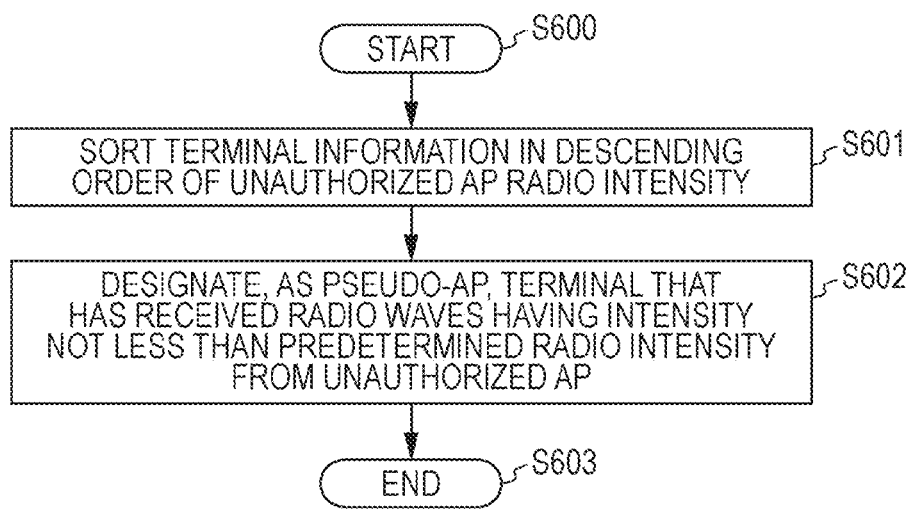
FIG. 6 is a flowchart showing an example of the process of step S503 shown in FIG. 5.

FIG. 6 is a flowchart showing an example of the process of step S503 shown in FIG. 5.

The process shown in FIG. 6 starts from step S600. In step S601, the pseudo-access point designation unit 206 refers to the terminal information database 212 and sorts terminal information in the descending order of the radio intensity of an unauthorized access point. In step S602, the pseudo-access point designation unit 206 designates, as a pseudo-access point, a terminal that has received radio waves having intensity not less than predetermined radio intensity from the unauthorized access point. The process then ends in step S603. In this embodiment, any level of radio intensity which is suitable for blocking wireless communications performed by an unauthorized access point can be set as predetermined radio intensity.

Figure 7:
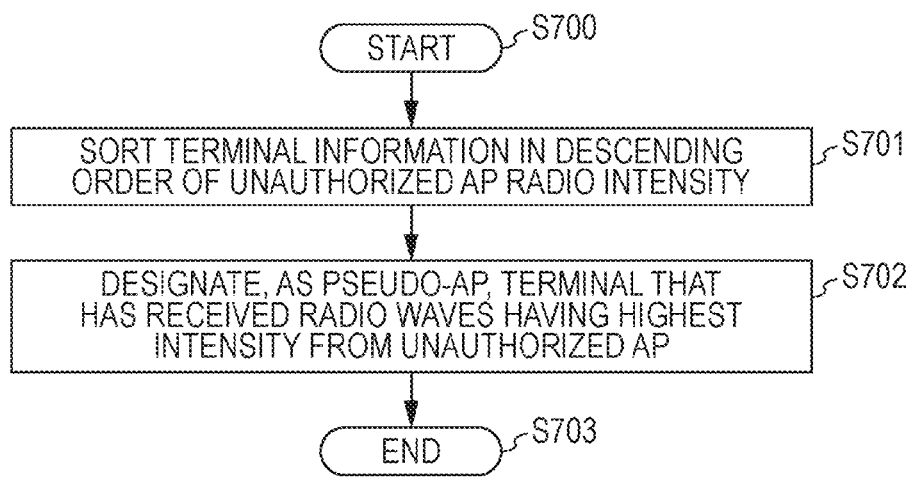
FIG. 7 is a flowchart showing another example of the process of step S503 shown in FIG. 5.

FIG. 7 is a flowchart showing another example of the process of step S503 shown in FIG. 5.

The process shown in FIG. 7 starts from step S700. In step S701, the pseudo-access point designation unit 206 refers to the terminal information database 212 and sorts terminal information in the descending order of the radio intensity of an unauthorized access point. In step S702, the pseudo-access point designation unit 206 designates, as a pseudo-access point, a terminal that has received radio waves having the highest intensity from the unauthorized access point. The process then ends in step S703.

FIG. 8 is a flowchart showing yet another example of the process of step S503 shown in FIG. 5. In this example, the monitoring server 110 includes a traffic monitoring unit for monitoring traffic on the network 130 and acquires traffic information including the amounts of traffic generated by the terminals 120a, 120b, 120c, and 120d and information for identifying the terminals.

The process shown in FIG. 8 starts from step S800. In step S801, the pseudo-access point designation unit 206 refers to the terminal information database 212 and sorts terminal information in the descending order of the radio intensity of an unauthorized access point. In step S802, the traffic monitoring unit monitors traffic on the network 130 and acquires traffic information. In step S803, the pseudo-access point designation unit 206 designates, as a pseudo-access point, a terminal that has received radio waves having intensity not less than predetermined radio intensity from the unauthorized access point and that has not generated traffic on the network. The process then ends in step S804. In this embodiment, any level of radio intensity which is suitable for blocking wireless communications performed by an unauthorized access point can be set as predetermined radio intensity.

In this example, a terminal which has not generated traffic on the network 130 is selectively designated as a pseudo-access point. Thus, a terminal which is not connected to the network by wire but is performing wireless LAN communications is prevented from being designated as a pseudo-access point. As a result, without blocking wireless communications performed by that terminal, those performed by an unauthorized access point can be blocked.

While the embodiment has been described, the present invention is not limited thereto. Changes, including a change to or deletion of any function means of the embodiment and addition of another function means, can be made thereto without departing from the scope conceivable for those skilled in the art. Any embodiment will fall within the scope of the present invention as long as the embodiment has functions and advantages of the invention.

REFERENCE SIGNS LIST

100: monitoring system
110: monitoring server
112a, 112b: hub
114: access point
120a, 120b, 120c, 120d: terminal
130: network
140: access point

The invention claimed is:

1. A monitoring system comprising:
a monitoring server that monitors an unauthorized access point; and
a plurality of terminals connected to the monitoring server via a network, wherein each of the terminals comprises a data processor coupled to a storage device having program code stored therein comprising:
a radio wave information acquisition program code portion configured to acquire, when executed by the data processor, radio wave information from radio waves transmitted by an access point;
a radio wave information transmission program code portion configured to transmit, when executed by the data processor, the radio wave information to the monitoring server; and
a radio wave transmission program code portion configured to transmit, when executed by the data processor, radio waves in accordance with an instruction from the monitoring server, and wherein the monitoring server comprises:
a terminal information registration program code portion configured to register, when executed by the data processor, terminal information in a database, the terminal information including the radio wave information received from the terminals;
an unauthorized access point detection program code portion configured to detect, when executed by the data processor, an unauthorized access point using the terminal information;
a pseudo-access point designation program code portion configured to designate, when executed by the data processor, a terminal as a pseudo-access point using intensity of radio waves transmitted by the unauthorized access point; and
a radio wave transmission instruction program code portion configured to instruct, when executed by the data processor, the terminal designated as the pseudo-access point to transmit radio waves.

2. The monitoring system according to claim 1, wherein the pseudo-access point designation code is configured to designate, when executed by the data processor, a terminal that has received radio waves from the unauthorized access point having intensity not less than predetermined intensity as the pseudo-access point.

3. The monitoring system according to claim 1, wherein the pseudo-access point designation code is configured to designate, when executed by the data processor, a terminal that has received radio waves from the unauthorized access point having a highest intensity as the pseudo-access point.

4. The monitoring system according to claim 1, wherein each terminal of the plurality of terminals further comprises:
a radio wave information database comprising terminal identification information, and radio intensity derived from radio waves detected by the terminal.

5. The monitoring system according to claim 4, wherein the radio wave transmission program code portion is configured to transmit, when executed by the data processor, the radio waves by referring to radio wave information in the radio wave information database to determine which radio waves are suitable to transmit for blocking wireless communications performed by the unauthorized access point.

6. The monitoring system according to claim 5, wherein the suitable radio waves are determined by identifying a channel being used by the unauthorized access point, and using radio waves in a same frequency band as that allocated to the channel.

7. A monitoring server for monitoring an unauthorized access point, comprising:
a data processor coupled to a storage device having program code that performs, when the program code is executed by the data processor, steps of:
registering terminal information in a database, the terminal information including radio wave information received from a plurality of terminals, the terminals being connected to the monitoring server via a network;
detecting an unauthorized access point using the terminal information;
designating a terminal as a pseudo-access point using intensity of radio waves transmitted by the unauthorized access point; and
instructing the terminal designated as the pseudo-access point to transmit radio waves.

8. The monitoring server according to claim 7, wherein the step of designating comprises designating a terminal that has received radio waves from the unauthorized access point having intensity not less than predetermined intensity as the pseudo-access point.

9. The monitoring server according to claim 7, wherein the step of designating comprises designating a terminal that has received radio waves from the unauthorized access point having a highest intensity as the pseudo-access point.

10. A method performed by a monitoring server for monitoring an unauthorized access point, the method comprising the steps of:
registering terminal information in a database, the terminal information including radio wave information received from a plurality of terminals, the terminals being connected to the monitoring server via a network;
detecting an unauthorized access point using the terminal information;
designating a terminal as a pseudo-access point using intensity of radio waves transmitted by the unauthorized access point; and
instructing the terminal designated as the pseudo-access point to transmit radio waves.

11. The method according to claim 10, wherein the step of designating the terminal as the pseudo-access point comprises a step of designating a terminal a terminal that has received radio waves from the unauthorized access point having intensity not less than predetermined intensity as the pseudo-access point.

12. The method according to claim 10, wherein the step of designating the terminal as the pseudo-access point comprises a step of designating a terminal that has received radio waves from the unauthorized access point having a highest intensity as the pseudo-access point.

13. An apparatus-executable program stored in a non-transitory storage device for causing a monitoring server to monitor for an unauthorized access point, when the program is executed by the monitoring server, by performing steps of:
registering terminal information in a database, the terminal information including radio wave information received from a plurality of terminals, the terminals being connected to the monitoring server via a network;
detecting an unauthorized access point using the terminal information;
designating a terminal as a pseudo-access point using intensity of radio waves transmitted by the unauthorized access point; and
instructing the terminal designated as the pseudo-access point to transmit radio waves.

14. A monitoring server for monitoring an unauthorized access point, comprising:

a data processor coupled to a storage device having program code that performs, when the program code is executed by the data processor, steps of:

registering terminal information in a database, the terminal information including radio wave information received from a terminal;

detecting an unauthorized access point using the terminal information;

designating a terminal as a pseudo-access point using intensity of radio waves transmitted by the unauthorized access point;

instructing the terminal designated as the pseudo-access point to transmit radio waves; and monitoring traffic on a network, wherein the step of designating comprises designating, as the pseudo-access point, a terminal that has received radio waves having intensity not less than predetermined intensity from the unauthorized access point, designating, as the pseudo-access point, a terminal that has received radio waves having a highest intensity from the unauthorized access point, or designating, as the pseudo-access point, a terminal that has received radio waves having intensity not less than predetermined intensity from the unauthorized access point and that has not generated traffic on the network.

* * * * *